US012687202B2

(12) United States Patent
Horne et al.

(10) Patent No.: US 12,687,202 B2
(45) Date of Patent: Jul. 21, 2026

(54) CONSTANT VELOCITY JOINT

(71) Applicant: Neapco Intellectual Property Holdings, LLC, Farmington Hills, MI (US)

(72) Inventors: Aaron Horne, Lathrup Village, MI (US); Riki Patel, Royal Oak, MI (US); Amber Stettnichs, Farmington Hills, MI (US)

(73) Assignee: Neapco Intellectual Property Holdings, LLC

( * ) Notice: Subject to any disclaimer, the term of this patent is extended or adjusted under 35 U.S.C. 154(b) by 289 days.

(21) Appl. No.: 18/585,530

(22) Filed: Feb. 23, 2024

(65) Prior Publication Data

US 2025/0271037 A1 Aug. 28, 2025

(51) Int. Cl.

| | |
|---|---|
| ***F16D 3/226*** | (2006.01) |
| ***F16L 21/03*** | (2006.01) |
| *F16D 3/223* | (2011.01) |

(52) U.S. Cl.

CPC .............. *F16D 3/226* (2013.01); *F16L 21/03* (2013.01); *F16D 2003/22326* (2013.01); *Y10S 464/906* (2013.01)

(58) Field of Classification Search

CPC ............ F16D 3/226; F16D 2003/22326; F16L 21/03; Y10S 464/906

USPC ............................ 464/17, 144, 182; 277/625

See application file for complete search history.

(56) References Cited

U.S. PATENT DOCUMENTS

| | | | | |
|---|---|---|---|---|
| 3,287,934 A * | 11/1966 | Asher | F16D 3/227 464/906 |
| 7,008,327 B2 * | 3/2006 | Kuczera | F16D 3/223 464/906 |
| 7,905,785 B2 * | 3/2011 | Madden | F16D 3/843 464/906 |
| 12,188,527 B2 * | 1/2025 | Ishikura | F16D 3/2245 |

OTHER PUBLICATIONS

Universal Joint and Driveshaft Design Manual, AE-7, Society of Automotive Engineers, Inc., Warrendale, PA, Sections 3.2.8 and 3.2.9, TJ1079.S62. (Year: 1979).*

* cited by examiner

*Primary Examiner* — Greg Binda

(74) *Attorney, Agent, or Firm* — Dickinson Wright PLLC

(57) ABSTRACT

A constant velocity joint includes an outer race that extends about an axis and is configured to be coupled with a first shaft. The outer race extends axially between a top surface and a bottom surface. An inner race is located in the compartment and is pivotable relative to the outer race for being connected with a second shaft. A plurality of balls are positioned between the outer and inner races for guiding the pivoting movement outer and inner races while transmitting rotational movement between the outer an inner races. An upper can is coupled to the top surface of the outer race for sealing the compartment of the outer race. A plurality of bolt holes extend axially through the outer race radially outwardly of the upper can.

16 Claims, 6 Drawing Sheets

13A
11A
14A
12A
13A
1A
14A
A
11A
14A
5A
14A
5A
2A
7A
13A
8A
10A
9A
6A
6A
13A

A 3A
15A
12A
4A
5A
1A
14A
10A
7A
2A
9A
13A
6A
8A

14B
A
13B
17B
17B
13B
14B
12B
1B
13B
14B
11B
17B
16B
2B

CONSTANT VELOCITY JOINT

FIELD

The present disclosure relates generally to vehicle driveline components. More particularly, the present disclosure relates to constant velocity joints for transmitting rotational movements between two shafts while permitting relative angular deflections between the two shafts.

BACKGROUND

This section of the written disclosure provides background information related to constant velocity joints and is not necessarily prior art to the inventive concepts disclosed and claimed in this application.

Constant velocity joints (CV joints) are used on drivelines of vehicles for transmitting rotational movement between two shafts while permitting angular deflections of the shafts relative to one another. An example of a prior art constant velocity joint is shown in FIGS. 1A to 2A. The prior art constant velocity joint 1A includes an outer race 2A that extends about an axis A and is configured to be coupled with a first shaft 3A (shown in FIG. 2A). The first shaft 3A includes a flange portion 4A that is configured to be positioned about and above the outer race 2A and coupled to the outer race 2A via bolts (not shown). The outer race 2A extends axially between a top surface 5A and a bottom surface 6A, and extends radially between a radially outer surface 7A and a radially inner surface 8A, which defines a compartment. A second shaft 9A extends along the axis A to a terminal end in the compartment of the outer race 2A. An inner race 10A is coupled with the second shaft 9A in the compartment and is pivotable relative to the outer race 2A. A plurality of balls 11A are positioned radially between the outer and inner races 2A, 10A for guiding the pivoting movement of the inner race 10A relative to the outer race 2A while transmitting rotational movement between the outer and inner races 2A, 10A. A press-fitted upper can 12A (cover) is coupled to the top surface 5A of the outer race 2A for sealing the compartment of the outer race 2A. As shown, the upper can 12A is formed over the outer race 12A along the radially outer surface 7A. A plurality of bolt holes 13A extend axially through the outer race 2A and are arranged circumferentially around the outer race 2A. Likewise, the upper can 12A defines a plurality of bolt holes 14A, each in alignment with one of the bolt holes 13A of the outer race 2A. A plurality of bolts (not shown) pass through the aligned bolt holes 13A, 14A to secure the outer race 2A and first shaft 3A to one another, with the upper can 12A serving as a sealing mechanism. This arrangement is typically used when there is ample storage space to accommodate the flange portion 4A of the first shaft 3A, and when there is a satisfactory axial gap between the upper can 12A and a flange nut 15A of the first shaft 3A (best shown in FIG. 2A). In cases in which there are restricted space requirements for the CV joint 1A, this arrangement can be unfeasible. More particularly, an inside diameter of the flange portion 4A of the first shaft 3A may not be large enough to support a required bolt circle diameter of the bolts along with the externally press fit upper can 12A without resulting in an insufficient cross-sectional thickness around the bolt holes 13A, 14A.

Thus, an alternative prior art CV joint 1B shown in FIGS. 1B and 2B includes a "recessed rear cover/can" type design to facilitate use of the CV joint 1B in restricted space applications. According to this design, instead of being clamped to an outside diameter of the outer race 2B, an upper can 12B is pressed into a counter bore 16B on the top surface 5B of the outer race 2B. This arrangement has a small diametrical profile while also providing ample axial clearance to an axle nut of a first shaft. The upper can 12B of this arrangement includes scallops (cutouts) 14B aligned with the bolt holes 13B of the outer race 2B, as well as a series of circumferentially spaced pockets 17B aligned with the balls 11B for inhibiting axial movement of the balls 11B. The upper can 12B of this design is secured to the outer race 2B via a press fit in the counter bore 16B. While this arrangement is more compact than the CV joint 1A of FIGS. 1A and 2A, the scallops 14B and pockets 12B of the upper can 12B can result in interrupted sealing along press fit areas against the outer race 2B, which can cause the CV joint 1B to be susceptible to grease loss and spray of the grease against an underside of the associated vehicle during use. More particularly, the scallops 14B and pockets 17B leave a relative small surface area for sealing the upper can 12B to the outer race 2B for retaining grease within the outer race 2B. The scallops 14B and ball pockets 17B are also required to have tight tolerances and must be precisely positioned relative to the outer race 2B during installation to provide a good seal. It is known to use sealants such as RTV (room temperature vulcanizing) at the interface between the outer race 2B and the upper can 12B to reduce risk of grease loss and ingress of external contaminants, but the use of such sealants may inadequately prevent grease leakage.

In view of the foregoing, there remains a need for further improvements to CV joint assemblies, particularly those intended for use in restricted space applications.

SUMMARY

This section provides a general summary of the inventive concepts associated with this disclosure and is not intended to be interpreted as a complete and comprehensive listing of all of its aspects, objectives, features and advantages.

According to an aspect of the disclosure, a constant velocity joint includes an outer race that extends about an axis and is configured to be coupled with a first shaft. The outer race extends axially between a top surface and a bottom surface, and extends radially between a radially outer surface and a radially inner surface. The radially inner surface of the outer race defines a compartment. An inner race is located in the compartment for being coupled with a second shaft and is pivotable relative to the outer race. A plurality of balls are positioned radially between the outer and inner races for guiding the pivoting movement of the inner race relative to the outer race while transmitting rotational movement between the outer and inner races. An upper can is coupled to the top surface of the outer race for sealing the compartment of the outer race. A plurality of bolt holes extend axially through the outer race and are arranged circumferentially around the outer race and positioned radially outwardly of the upper can for receiving bolts to attach the outer race to the first shaft.

The position of the upper can radially inwardly of the bolt holes eliminates the need for the bolts to pass through the upper can, which provides a large sealing area of the upper can to the outer race 360 degrees circumferentially around the entire upper can. This minimizes grease loss and spray to the underside of the vehicle. Furthermore, the upper can is simple in design and easy to fabricate in that can to be made via a simple stamping process.

According to another aspect of the disclosure, a constant velocity joint includes an outer race that extends about an axis and is configured to be coupled with a first shaft. The outer race extends axially between a top surface and a bottom surface and extends radially between a radially outer surface and a radially inner surface. The radially inner surface of the outer race defines a compartment. An inner race is located in the compartment for being coupled with the second shaft in the compartment and is pivotable relative to the outer race. A plurality of balls are positioned radially between the outer and inner races for guiding the pivoting movement of the inner race relative to the outer race while transmitting rotational movement between the outer and inner races. An upper can is coupled to the top surface of the outer race for sealing the compartment of the outer race. The inner circumference of the outer race presents at least one rim that extends radially over the balls under the counter bore of the outer race to define at least one pocket that receives the balls to limit axial movement of the balls.

Locating the at least one rim on the outer race eliminates the need to form ball pockets on the upper can, thus eliminating required design/manufacturing tolerances and permitting the upper can to be fabricated in a simple manner. Also, because the rim is located beneath the top surface of the outer race instead of on the upper can, space is provided at the top surface of the outer race to form a counter bore for holding the upper can radially inwardly of the bolt holes.

BRIEF DESCRIPTION OF DRAWINGS

The drawings described herein are for illustrative purposes only of selected embodiments and not all possible implementations, and are not intended to limit the scope of the present disclosure.

FIG. 1B is a perspective cross-sectional view of a second conventional arrangement of a constant velocity joint;

DETAILED DESCRIPTION

Figure 1A:
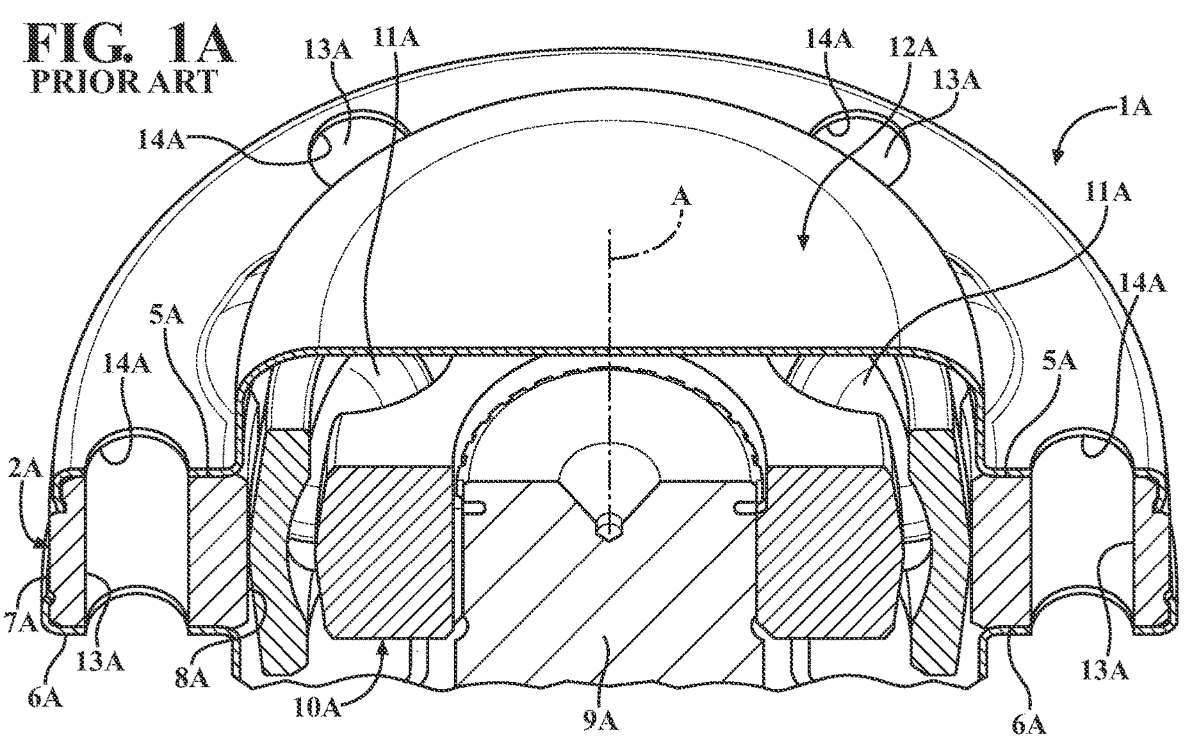
FIG. 1A is a perspective cross-sectional view of a first conventional arrangement of a constant velocity joint.
Figure 1C:
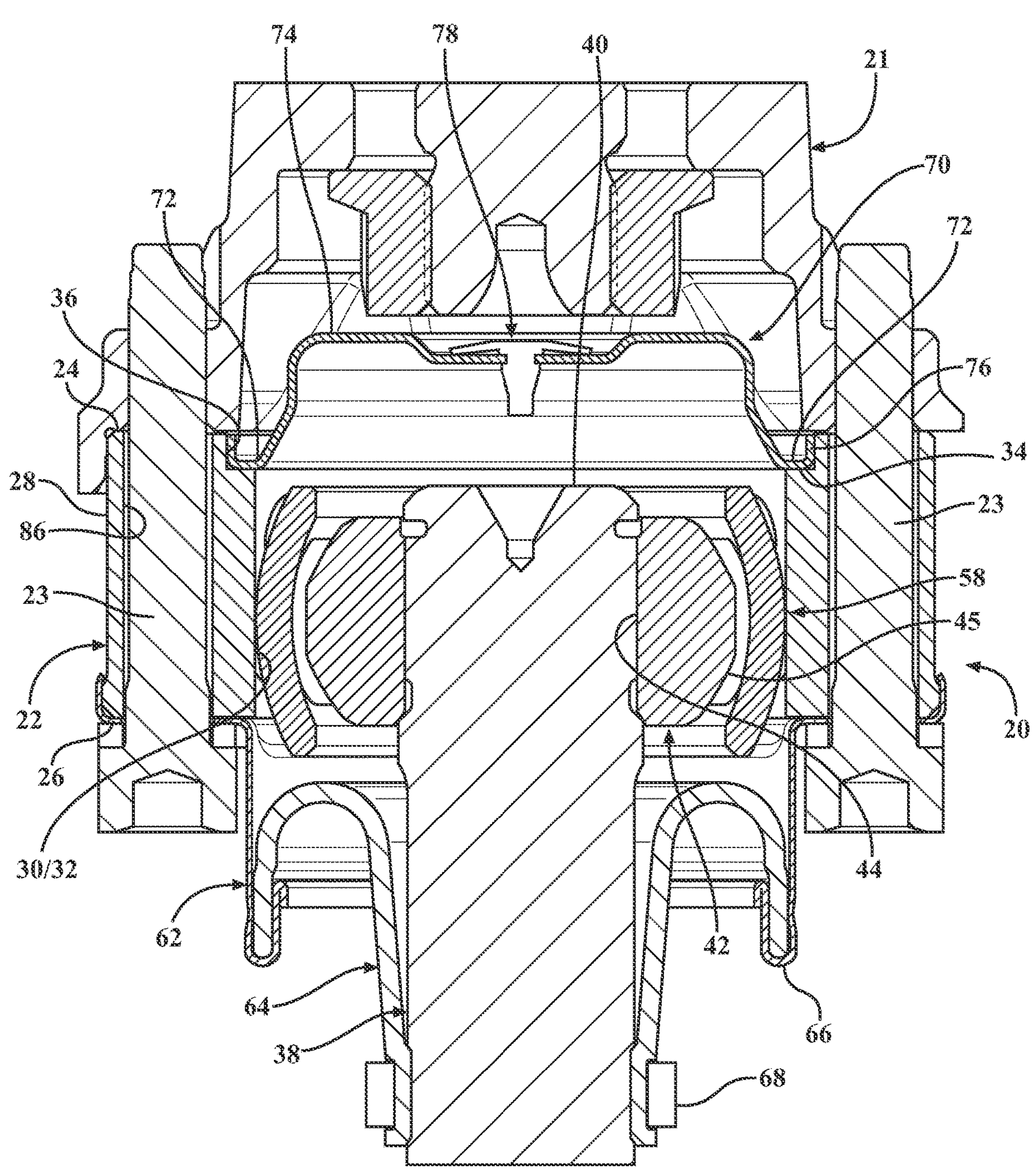
FIG. 1C is a side, cross-sectional view of an embodiment of a constant velocity joint according to an aspect of the present disclosure, illustrating a connection to first and second shafts.

Exemplary embodiments will now be described more fully with reference to the accompanying drawings. In particular, a number of non-limiting embodiments of a constant velocity joint 20 ("CV joint") are provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present invention can be utilized in connection with other types of automobile components not described fully herein.

The CV joint 20 could be used on various vehicle components such as propeller shafts, drive shafts, half shafts, axles, transfer cases, power takeoff ("PTO") units, and/or other components that operate to transmit rotational forces (i.e., rotational energy), between and/or through one or more other driveline components.

With reference to FIGS. 1C-4C, the CV joint 20 includes an outer race 22 that extends about an axis A and is configured to be coupled with a first shaft 21 via an arrangement of a number of bolts 23. The outer race 22 extends axially between a top surface 24 and a bottom surface 26, and extends radially between a radially outer surface 28 and a radially inner surface 30. The radially inner surface 30 defines a compartment 32. The top surface 24 of the outer race 24 defines a counter bore 34, 36 that extends axially downwardly along the radially inner surface 30. More particularly, the counter bore 34, 36 is defined by an annular radial wall 34 that extends along a plane that is perpendicular to the axis A, and an annular axial wall 36 that extends axially. As will be described in further detail below, the top surface 24 of the outer race 22 defines a plurality of bolt holes 86 that are spaced circumferentially from one another around the outer race 22 and around the counter bore 34, 36 for connecting the outer race 22 to the first shaft 21 via the arrangement of bolts 23.

A second shaft 38 extends along the axis A to a terminal end 40 in the compartment 32 of the outer race 22. An inner race 42 is coupled with the second shaft 38 adjacent to the terminal end 40 in the compartment 32. The inner race 42 is pivotable relative to the outer race 22 such that the second shaft 38 and inner race 42 together are pivotable relative to the outer race 22 and the first shaft. The inner race 42 has a radially inward surface 44 and a radially outward surface 45.

Figure 2A:
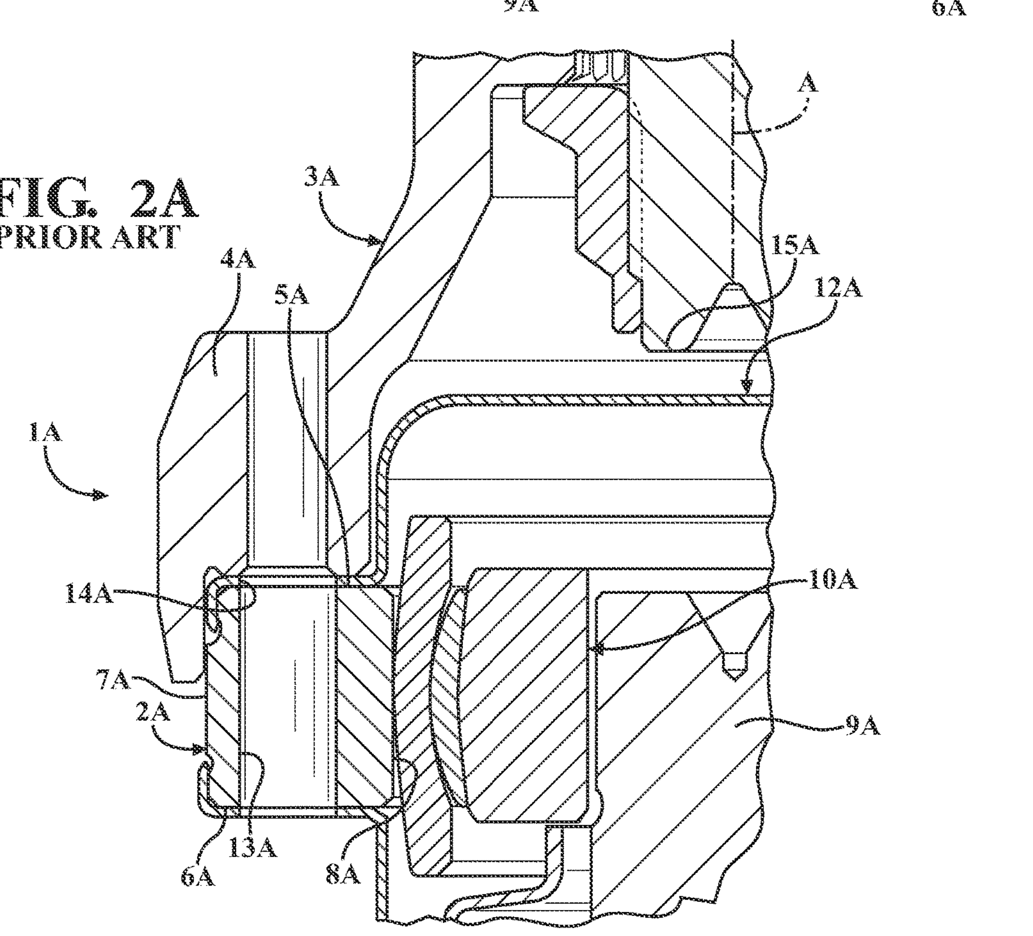
FIG. 2A is a side, cross-sectional view of a connection between the first conventional arrangement of a constant velocity joint and a first shaft.
Figure 2B:
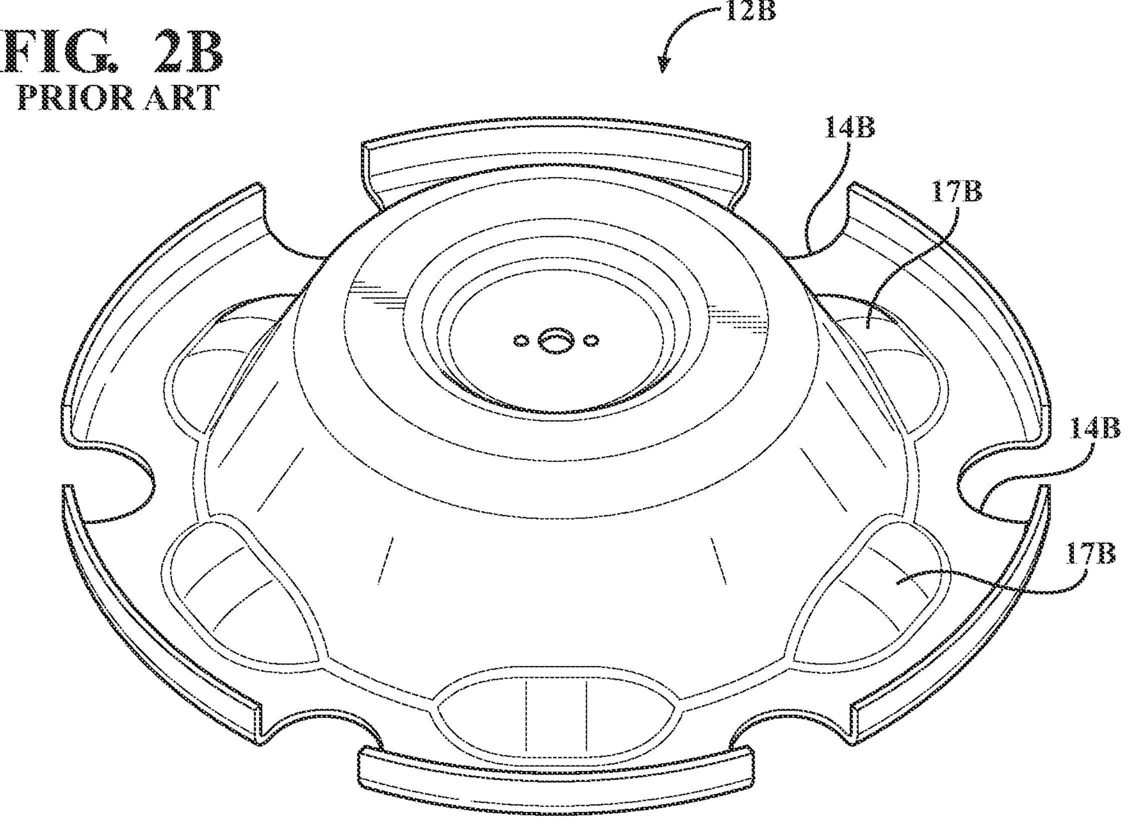
FIG. 2B is a perspective view of an upper can of the second conventional arrangement of a constant velocity joint.
Figure 2C:
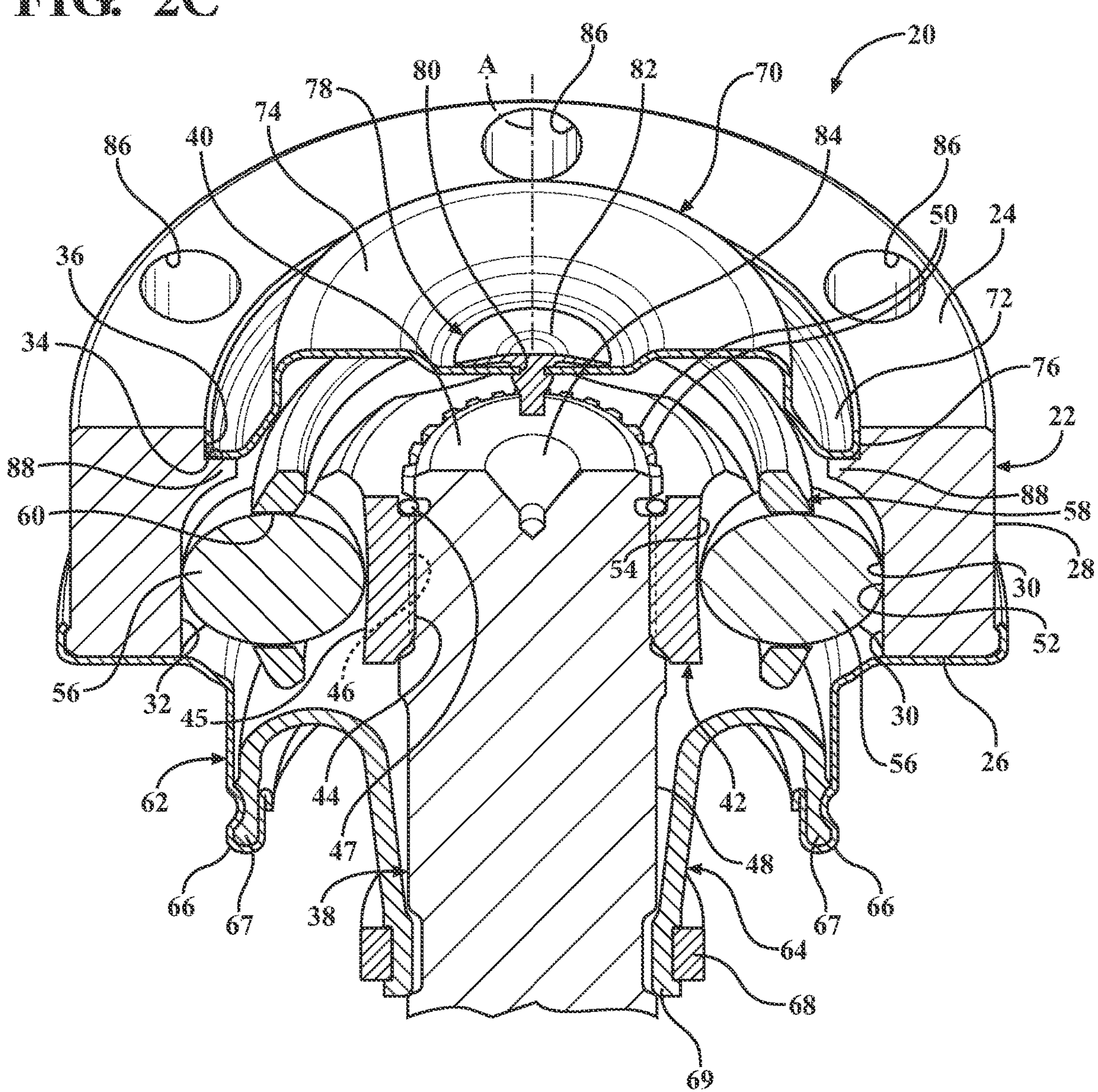
FIG. 2C is a perspective, cross-sectional view of the constant velocity joint of FIG. 1C.

As best shown in FIG. 2C, the radially inward surface 44 of the inner race 42 defines a plurality of axial slots 46 that are arranged in circumferentially spaced relationship with one another around the radially inward surface 44. An outside surface 48 of the second shaft 38 presents a plurality of axially extending ribs 50 positioned in circumferentially spaced relationship with one another around the outside surface 48. Each of the ribs 50 are received by one of the axial slots 46 of the inner race 42 to rotationally connect the second shaft 38 and the inner race 42 while accommodating axial movement of the second shaft 38 relative to the inner race 42 to connect the second shaft 38 to the inner race 42. Furthermore, a retaining ring 47, is positioned radially between the second shaft 38 and the inner race 42 to affix the inner race 42 to the second shaft 38.

Figure 3C:
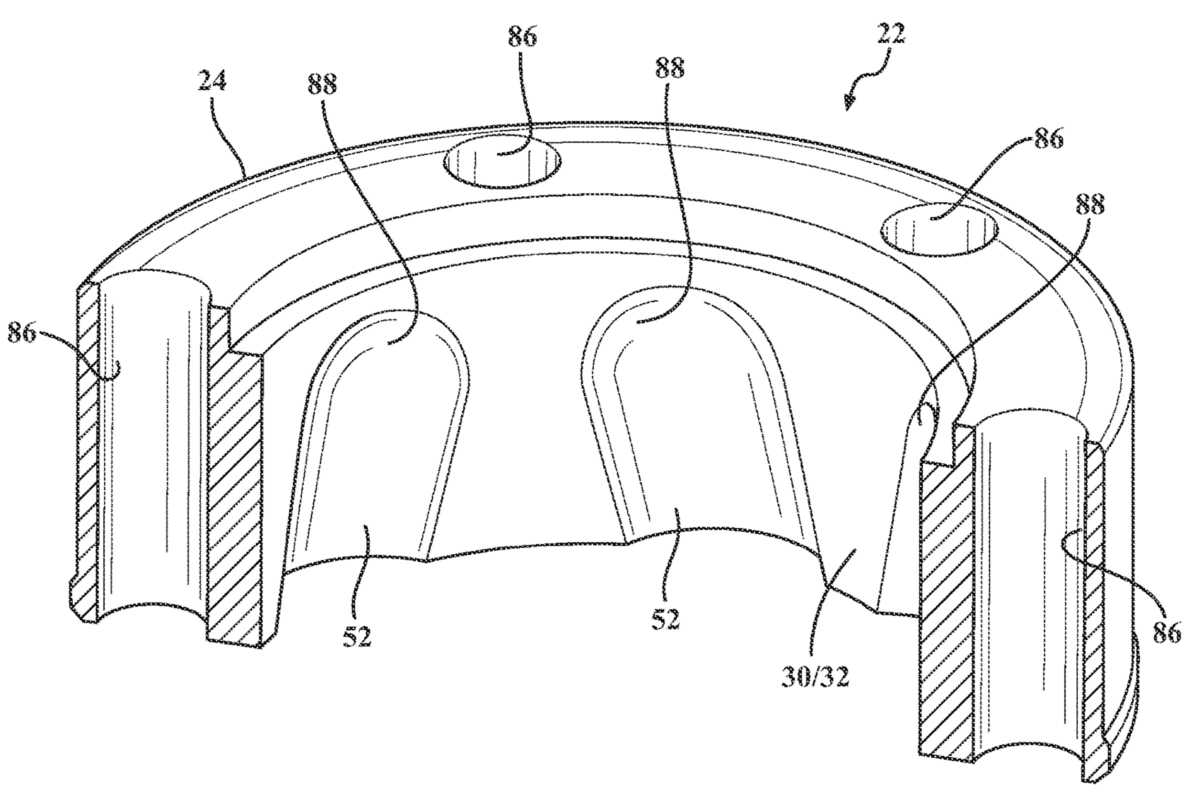
FIG. 3C is a perspective view of an upper can of the constant velocity joint of FIG. 1C.

The radially inner surface 30 of the outer race 22 defines a plurality of first ball tracks 52 that are arranged in circumferentially spaced relationship with one another. The radially outward surface 45 of the inner race 42 defines a plurality of second ball tracks 54, each in circumferential alignment with the first ball tracks 52 of the outer race 22. A plurality of balls 56 are positioned radially between the outer and inner races 22, 42, each in one of the first and second ball tracks 52, 54 for guiding the pivoting movement of the outer and inner races 22, 42 relative to one another while also transmitting rotational movement between the outer and inner races 22, 42. As best illustrated in FIG. 3C, the radially inner surface 30 of the outer race 22 presents a plurality of rims 88 at an axial top of each the first ball tracks 52. Each of the rims 88 are hemispherical-shaped and extend radially over the balls 56 axially under the counter bore 34, 36 of the outer race 22 to define a pocket for axially limiting movement of/containing the balls 56. Because the first ball tracks 52 are truncated in this manner beneath the top surface 24 of the outer race 22 to form the rims 88, it is feasible to form the counter bore 34, 36 radially inwardly of the bolts holes 86. This is contrary to prior CV joints in which pockets are formed in an upper can.

With reference back to FIGS. 1C-2C, a cage 58 is positioned in the compartment 32 between the outer and inner races 22, 42. The cage 58 defines a plurality of openings 60 each for receiving one of the balls 56 for aligning the balls 56 in predetermined locations.

A lower can 62 is fixed to the bottom surface 26 of the outer race 22 about the second shaft 38. A boot seal 64 extends radially between, and is sealed against the second shaft 38 and the lower can 62. The lower can 62 has a crimped end 66 that is crimped about a first end 67 of the boot seal 64 in order to seal the first end 67 of the boot seal 64 to the lower can 62. Furthermore, a clamp 68 is wrapped annularly about a second end 69 of the boot seal 64 and the second shaft 38 to seal the second end 69 of the boot seal 64 to the second shaft 38.

Figure 4C:
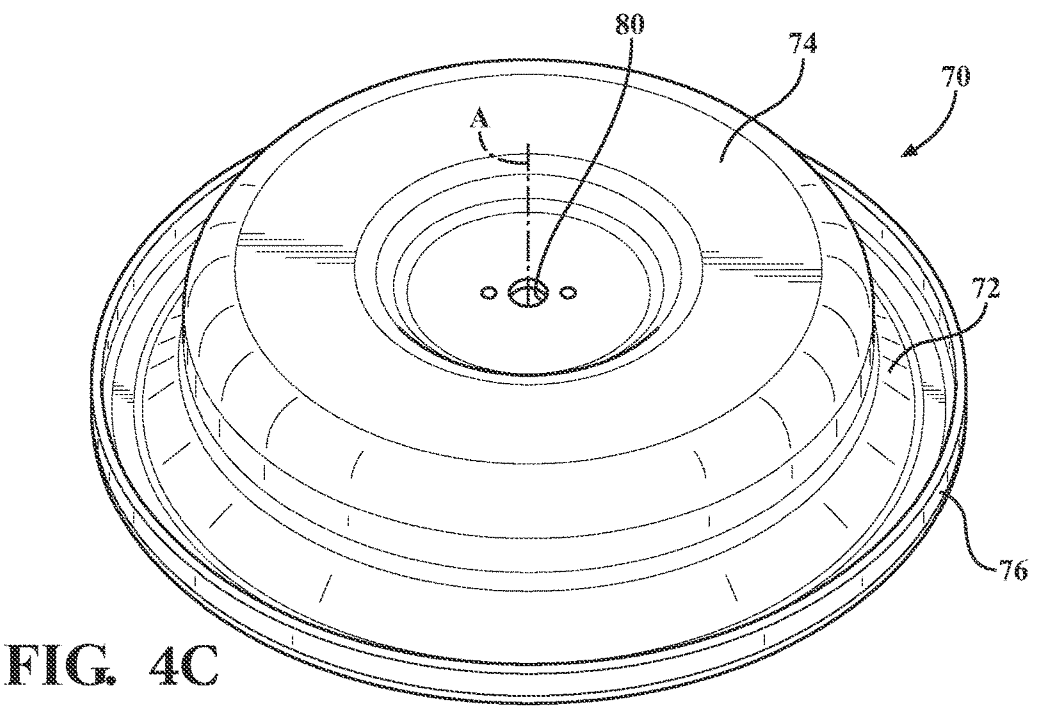
FIG. 4C is a perspective, cross-sectional view of an outer race of the constant velocity joint of FIG. 1C, illustrating an arrangement of first ball tracks and associated rims for limiting movement of balls.

As best shown in FIGS. 2C and 4C, a generally cup-shaped upper can 70 is coupled with the top surface 24 of the outer race 22 in the counter bore 34, 36 of the outer race 22. The upper can 70 has a rim portion 72 and a protruding portion 74 located centrally relative to the rim portion 72. The upper can 70 extends axially upwardly relative to the rim portion 72. The rim portion 72 overlies the radial wall 34 of the counter bore 34, 36 of the outer race 22 and terminates at a lip 76 that extends axially upwardly and engages the axial wall 36 of the counter bore 34, 36. The upper can 70 is fitted within the counter bore 34, 36 with a press/interference fit. Together, the lower and upper cans 62, 70 and the boot seal 64 are configured to seal the compartment 32 to prevent contaminants from entering the compartment 32.

The upper can 70 defines a vent plate portion 78 along the axis A. The vent plate portion 78 includes a mounting aperture 80 that is defined by the upper can 70 along the axis A. A vent valve 82 is received by the mounting aperture 80 for sealing the compartment 32 and to operate as a one-way valve to allow air to escape the compartment 32 when the air in the compartment 32 reaches a predetermined pressure, while preventing contaminants from entering the compartment 32. The terminal end 40 of the second shaft 38 may define a recess 84 for aiding in positioning the second shaft 38 during various manufacturing operations.

As previously noted, the top surface 24 of the outer race 22 defines the plurality of bolt holes 86. The bolt holes 86 extend axially through the outer race 22 and are arranged circumferentially around the outer race 22. The bolt holes 86 are positioned radially outwardly of the counter bore 34, 36 and the upper can 70 for receiving bolts 23 to attach the outer race 22 to the first shaft (best shown in FIG. 1C).

Because the upper can 70 is located radially inwardly of the bolt holes 86, it provides continuous and uninterrupted sealing 360 degrees around the upper can 70 against outer race 22. This is contrary to prior art CV joints which had scallops for receiving bolts defined in the upper can which were prone to inconsistent sealing and grease leaks. Furthermore, the arrangement of the upper can 70 being free of ball pockets due to the presence of the rims 88 of the outer race 22 removes design/manufacturing tolerances and provides simpler positioning of the upper can 70.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A constant velocity joint, comprising:

an outer race extending about an axis and configured to be coupled with a first shaft;

the outer race extending axially between a top surface and a bottom surface and extending radially between a radially outer surface and a radially inner surface, the radially inner surface of the outer race defining a compartment;

an inner race in the compartment and pivotable relative to the outer race for being connected to a second shaft;

a plurality of balls positioned radially between the outer and inner races for guiding the pivoting movement of the inner race relative to the outer race while transmitting rotational movement between the outer and inner races;

an upper can coupled to the top surface of the outer race for sealing the compartment of the outer race, wherein the top surface of the outer race defines a counter bore along the radially inner surface of the outer race radially inward of a plurality of bolt holes, and wherein the upper can is fixed in the counter bore;

the radially inner surface of the outer race defining a plurality of first ball tracks, and the radially inner surface of the outer race presenting a plurality of rims at an axial top of each of the first ball tracks, each of the rims extending radially over the balls axially under the counter bore of the outer race to define a respective pocket that receives a respective one of the balls and limits axial movement of the respective one of the balls; and the plurality of bolt holes extending axially through the outer race and arranged circumferentially around the outer race and positioned radially outwardly of the upper can for receiving bolts to attach the outer race to the first shaft.

2. The constant velocity joint as set forth in claim 1, wherein the counter bore extends axially downwardly along the radially inner surface of the outer race radially inward of the bolt holes, and wherein the upper can is fixed in the counter bore.

3. The constant velocity joint as set forth in claim 2, wherein the upper can is press fit in the counter bore.

4. The constant velocity joint as set forth in claim 2, wherein the upper can has a rim portion in the counter bore, and wherein the rim portion engages the top surface of the outer race in the counter bore continuously and uninterrupted 360 degrees around the rim.

5. The constant velocity joint as set forth in claim 4, wherein the counter bore includes a radial wall extending along a plane being perpendicular to the axis and an axial wall extending axially, and wherein the rim portion overlies the radial wall of the counter bore of the outer race and terminates at a lip extending axially upwardly and engaging the axial wall of the counter bore.

6. The constant velocity joint as set forth in claim 1, wherein each of the rims is hemispherical shaped.

7. The constant velocity joint as set forth in claim 6, wherein the first ball tracks are truncated beneath the top surface of the outer race to form the rims.

8. The constant velocity joint as set forth in claim 6, wherein a radially outward surface of the inner race defines a plurality of axially extending second ball tracks, and wherein the first ball tracks and the second ball tracks are circumferentially aligned with one another with one of the plurality of balls positioned between each of the aligned ball tracks.

9. A constant velocity joint, comprising:

an outer race extending about an axis and configured to be coupled with a first shaft;

the outer race extending axially between a top surface and a bottom surface and extending radially between a radially outer surface and a radially inner surface, the radially inner surface of the outer race defining a compartment;

an inner race located in the compartment and pivotable relative to the outer race for being connected with a second shaft;

a plurality of balls positioned radially between the outer and inner races for guiding the pivoting movement of the inner race relative to the outer race while transmitting rotational movement between the outer and inner races;

an upper can coupled to the top surface of the outer race for sealing the compartment of the outer race, wherein the top surface of the outer race defines a counter bore along the radially inner surface of the outer race, and wherein the upper can is fixed in the counter bore; and the radially inner surface of the outer race defining a plurality of first ball tracks, and the radially inner surface of the outer race presenting a plurality of rims at an axial top of each of the first ball tracks, each of the rims extending radially over the balls axially under the counter bore of the outer race to define a respective pocket that receives a respective one of the balls and limits axial movement of the respective one of the balls.

10. The constant velocity joint as set forth in claim 9, wherein each of the rims is hemispherical shaped.

11. The constant velocity joint as set forth in claim 10, wherein a radially outward surface of the inner race defines a plurality of axially extending second ball tracks, wherein the first and second ball tracks are circumferentially aligned with one another and with one of the plurality of balls positioned between each of the aligned ball tracks.

12. The constant velocity joint as set forth in claim 10, wherein the top surface of the outer race defines a plurality of bolt holes extending axially through the outer race and arranged circumferentially around the outer race and positioned radially outwardly of the upper can for receiving bolts to attach the outer race to the first shaft.

13. The constant velocity joint as set forth in claim 12, wherein the top surface of the outer race defines the counter bore along the radially inner surface of the outer race radially inward of the bolt holes, and wherein the upper can is fixed in the counter bore.

14. The constant velocity joint as set forth in claim 13, wherein the upper can has a rim portion in the counter bore, and wherein the rim portion engages the top surface of the outer race in the counter bore continuously and uninterrupted 360 degrees around the rim.

15. The constant velocity joint as set forth in claim 13, wherein the upper can is press fit in the counter bore.

16. The constant velocity joint as set forth in claim 13, wherein the counter bore includes a radial wall extending along a plane being perpendicular to the axis and an axial wall extending axially, and wherein the upper can has a rim portion overlying the radial wall of the counter bore of the outer race and terminating at a lip extending axially upwardly and engaging the axial wall of the counter bore.

* * * * *